(12) United States Patent
Matsuzuki et al.

(10) Patent No.: US 10,252,446 B2
(45) Date of Patent: *Apr. 9, 2019

(54) SHAPE FORMING SYSTEM AND SHAPE FORMING METHOD

(71) Applicant: Toshiba Kikai Kabushiki Kaisha, Chiyoda-ku, Tokyo-to (JP)

(72) Inventors: Isao Matsuzuki, Numazu (JP); Yoshihiro Yamamoto, Numazu (JP); Ryuji Tanaka, Gifu (JP); Yu Murofushi, Numazu (JP)

(73) Assignee: Toshiba Kikai Kabushiki Kaisha, Tokyo-to (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/919,262

(22) Filed: Mar. 13, 2018

(65) Prior Publication Data

US 2018/0200923 A1 Jul. 19, 2018

Related U.S. Application Data

(63) Continuation of application No. 14/671,307, filed on Mar. 27, 2015, now Pat. No. 9,943,990, which is a (Continued)

(30) Foreign Application Priority Data

Sep. 28, 2012 (JP) .................................. 2012-217759
Mar. 29, 2013 (JP) .................................. 2013-073442

(51) Int. Cl.
*B29C 33/36* (2006.01)
*B29C 33/02* (2006.01)
(Continued)

(52) U.S. Cl.
CPC .............. *B29C 33/36* (2013.01); *B29C 33/02* (2013.01); *B29C 43/06* (2013.01); *B29C 43/08* (2013.01);
(Continued)

(58) Field of Classification Search
CPC ......... B29C 33/36; B29C 43/08; B29C 43/06; B29C 33/02; C03B 2215/86;
(Continued)

(56) References Cited

U.S. PATENT DOCUMENTS 3,373,460 A 3/1968 Ladney
3,584,109 A 6/1971 Meadors et al.
(Continued)

FOREIGN PATENT DOCUMENTS

CN 19551843 4/2007
CN 101370741 2/2009
(Continued)

OTHER PUBLICATIONS

International Search Report issued in PCT/JP2013/076163 dated Dec. 17, 2013 with Translation.
(Continued)

*Primary Examiner* — Anthony Calandra
*Assistant Examiner* — Jerzi H Moreno Hernandez
(74) *Attorney, Agent, or Firm* — DLA Piper LLP US; Dale Lazar

(57) ABSTRACT

A shape forming system according to one embodiment includes a mold assemblies; a heating unit; a pressing unit; a cooling unit; an isolation chamber configured to accommodate therein the heating unit, the pressing unit, and the cooling unit arranged in parallel with each other; and a conveyance unit configured to move the plurality of mold assemblies each of which is arranged on a plate provided in
(Continued)

each of the heating unit, the pressing unit, and the cooling unit to thereby convey the mold assemblies in sequence.

1 Claim, 12 Drawing Sheets

Related U.S. Application Data continuation of application No. PCT/JP2013/076163, filed on Sep. 26, 2013.

(51) Int. Cl.
| | | |
|---|---|---|
| *B29C 43/06* | (2006.01) | |
| *C03B 11/12* | (2006.01) | |
| *B29C 43/08* | (2006.01) | |
| *B29L 31/00* | (2006.01) | |

(52) U.S. Cl.
CPC .......... *C03B 11/122* (2013.01); *C03B 11/125* (2013.01); *B29L 2031/00* (2013.01); *C03B 2215/06* (2013.01); *C03B 2215/66* (2013.01); *C03B 2215/86* (2013.01); *Y02P 40/57* (2015.11)

(58) Field of Classification Search
CPC . C03B 11/125; C03B 11/122; C03B 2215/66; C03B 2215/06; Y02P 40/57; B29L 2031/00
See application file for complete search history.

(56) References Cited

U.S. PATENT DOCUMENTS

| | | | |
|---|---|---|---|
| 5,015,280 | A | 5/1991 | Kimoto et al. |
| 5,173,100 | A | 12/1992 | Shigyo et al. |
| 5,188,652 | A | 2/1993 | Nakamura et al. |
| 5,284,501 | A | 2/1994 | Monji et al. |
| 5,599,565 | A | 2/1997 | Dittlo |
| 5,766,294 | A | 6/1998 | Takagi et al. |
| 5,816,991 | A | 10/1998 | Sato |
| 6,592,785 | B1 | 7/2003 | Mukasa |
| 7,699,595 | B2 | 4/2010 | Spengler |
| 9,505,149 | B2 * | 11/2016 | Matsuzuki .............. B29C 33/34 |
| 9,943,990 | B2 * | 4/2018 | Matsuzuki ............ C03B 11/122 |
| 2007/0092592 | A1 | 4/2007 | Chiang |
| 2008/0031990 | A1 | 2/2008 | Woo et al. |
| 2008/0230932 | A1 * | 9/2008 | Tanaka .................... C03B 11/08 264/1.1 |
| 2008/0282737 | A1 * | 11/2008 | Ohgami ................ C03B 11/005 65/157 |
| 2012/0086141 | A1 * | 4/2012 | Jung ..................... B29C 45/045 264/39 |
| 2014/0144863 | A1 * | 5/2014 | Sagawa .................... B61G 7/10 213/7 |
| 2014/0283555 | A1 | 9/2014 | Masuda |
| 2014/0318183 | A1 | 10/2014 | Yamada et al. |

FOREIGN PATENT DOCUMENTS

| | | |
|---|---|---|
| JP | H02-137740 | 5/1990 |
| JP | H02-192423 | 7/1990 |
| JP | H09-239757 | 9/1997 |
| JP | H09-268019 | 10/1997 |
| JP | 2007-131489 | 5/2007 |
| JP | 2007-153647 | 6/2007 |
| JP | 2010-089970 | 4/2010 |
| JP | 2010089970 A * | 4/2010 |
| JP | 2010-222226 | 10/2010 |
| JP | 2011-006270 | 1/2011 |
| JP | 2011006270 A * | 1/2011 |
| JP | 2012-116697 | 6/2012 |
| JP | 2012-116705 | 6/2012 |
| JP | 2013-028503 | 2/2013 |
| JP | 2014-051431 | 3/2014 |
| WO | WO 2014/051014 | 4/2014 |

OTHER PUBLICATIONS

International Preliminary Report on Patentability and Written Opinion of the International Searching Authority issued in PCT/JP2013/076163 dated Mar. 31, 2015.
Korean Office Action issued in KR10-2014-0060996 dated Jul. 29, 2015.
Japanese Office Action issued in JP 2014-538607 dated Nov. 17, 2015.
Chinese Office Action issued in CN 201410217936.X dated Feb. 1, 2016.
Taiwan Action issued in TW 103117147 dated May 24, 2016.
Chinese Office Action issued in CN 201380050898.7 dat Jun. 24, 2016.
Japanese Office Action issued in JP 2013-108158 dated Aug. 23, 2016.
Korean Office Action issued in KR 10-2015-7010995 dated Oct. 18, 2016.
Chinese Office Action issued in 201380050898.7 dated Feb. 13, 2017.
Chinese Office Action issued in 201380050898.7 dated Jul. 14, 2017.

\* cited by examiner

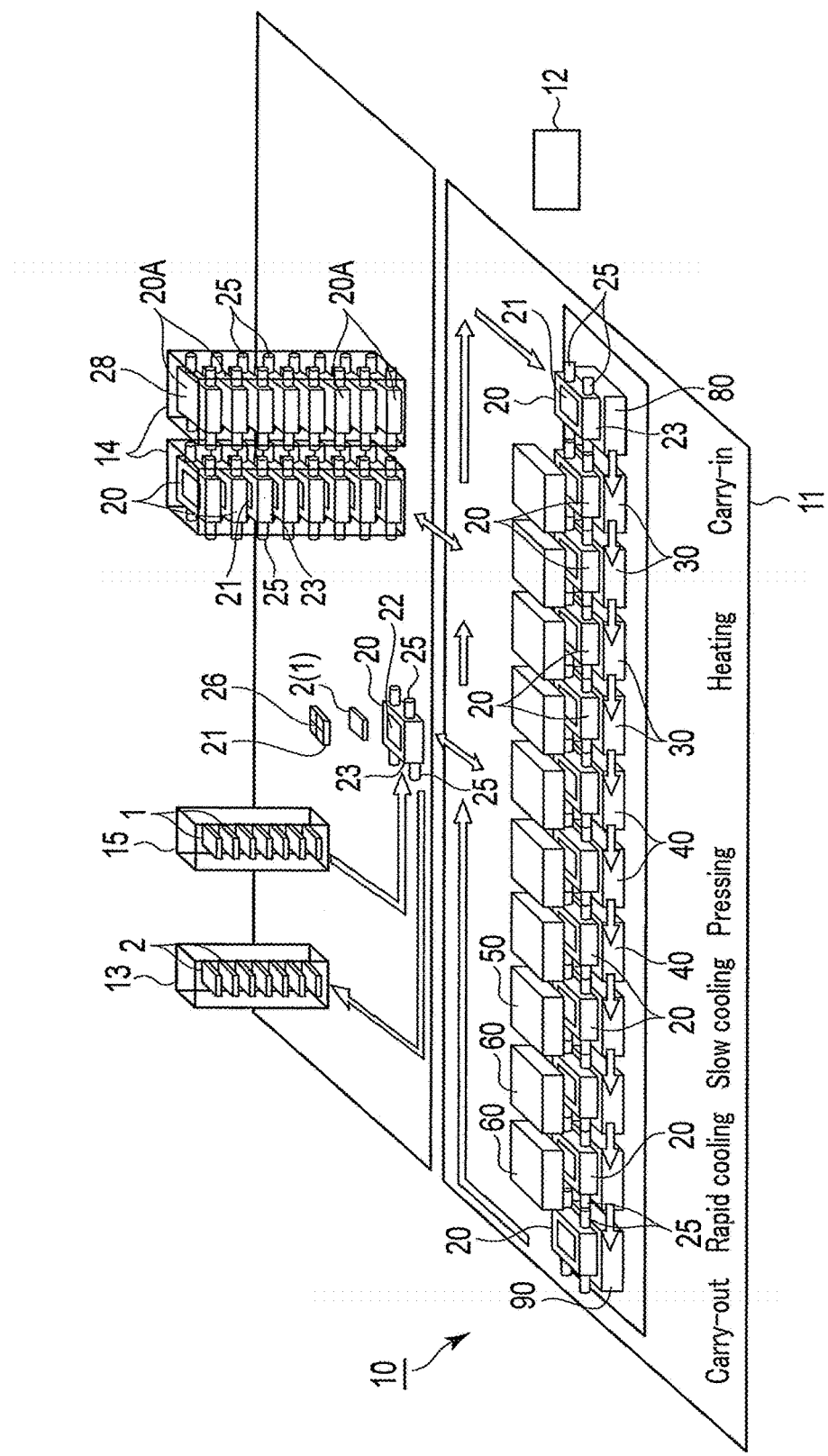
F I G. 1

SHAPE FORMING SYSTEM AND SHAPE FORMING METHOD

CROSS-REFERENCE TO RELATED APPLICATIONS

This application is Continuation of application Ser. No. 14/671,307 filed Mar. 27, 2015, which is a Continuation Application of PCT Application No. PCT/JP2013/076163 filed Sep. 26 2013 and based upon and claiming the benefit of priority from Japanese Patent Application No. 2012-217759, filed Sep. 28, 2012; and 2013-073442, filed Mar. 29, 2013; the entire contents of all of which are incorporated herein by reference.

BACKGROUND OF THE INVENTION

1. Filed of the Invention

Present invention relates to a shape forming system and shape forming method and, more specifically, to, for example, a system and method configured to heat and soften a material to be formed, and subject the softened material to press forming to thereby manufacture a shaped product.

2. Description of the Related Art

A mold-transfer type shape forming system which is configured to thermally soften a material to be formed, and press the softened material to manufacture a shaped product and, in which a shape forming cycle is shortened by moving each of mold assemblies holding materials to be formed between units configured to respectively carry out a heating treatment, press forming treatment, and cooling treatment to thereby simultaneously advance each of the heating process, shape forming process, and cooling process for a plurality of materials to be formed is known (see for example, Jpn. Pat. Appln. KOKAI Publication No. 2007-131489).

In a shape forming system of this kind, units are arranged in parallel in one boxy isolation chamber in order to maintain the non-oxidative atmosphere such as an inert gas or the like inside the system. Further, the shape forming system is provided with conveyance units configured to convey mold assemblies between the units.

BRIEF SUMMARY OF THE INVENTION

In the above-mentioned shape forming system and shape forming method, it is required that the treatment be carried out with a high degree of efficiency. In Pat. Document 1, a conveyance unit is required between each of the units, and hence the system becomes complicated and expensive. Further, the isolation chamber contains therein the conveyance units, hence the size of the isolation chamber becomes large. When the isolation chamber becomes large, the footprint thereof also becomes large. Further, the amount of the inert gas to be used also becomes large, and the running cost becomes high.

A shape forming system according to one aspect comprises mold assemblies configured to retain to-be-formed materials; a heating unit configured to heat the mold assembly to thereby subject the to-be-formed material to a heating treatment; a pressing unit configured to apply pressure to the mold assembly to thereby subject the to-be-formed material to a shape forming treatment; a cooling unit configured to cool the mold assembly after the shape forming treatment to thereby subject a shaped product obtained by subjecting the to-be-formed material to the shape forming treatment to a cooling treatment; an isolation chamber configured to accommodate therein the heating unit, the pressing unit, and the cooling unit arranged in parallel with each other; and a conveyance unit configured to move the plurality of mold assemblies each of which is arranged on a plate provided in each of the heating unit, the pressing unit, and the cooling unit to thereby convey the mold assemblies in sequence.

According to the present invention, it becomes possible to realize a high-efficiency shape forming system and high-efficiency shape forming method.

BRIEF DESCRIPTION OF THE SEVERAL VIEWS OF THE DRAWINGS

The accompanying drawings, which are incorporated in and constitute a part of the specification, illustrate embodiment of the invention, and together with the general description given above and the detailed description of the embodiments given below, serve to explain the principles of the invention.

FIG. 1 is an explanatory view schematically showing the configuration of a shape forming system according to a first embodiment of the present invention.

DETAILED DESCRIPTION OF THE INVENTION

First Embodiment

Hereinafter, a first embodiment of the present invention will be described with reference to FIGS. 1 to 13. It should be noted that in each drawing, the configuration is appropriately enlarged, reduced, and abbreviated to be schematically shown.

A shape forming system 10 shown in FIG. 1 is the shape forming system 10 configured to soften a to-be-formed material 1 by a heating treatment, and subject the softened to-be-formed material 1 to forming by a pressing treatment to thereby manufacture a shaped product 2 represented by, for example, a cover glass or the like for a smartphone or a tablet terminal as a shaped product.

Figure 2:
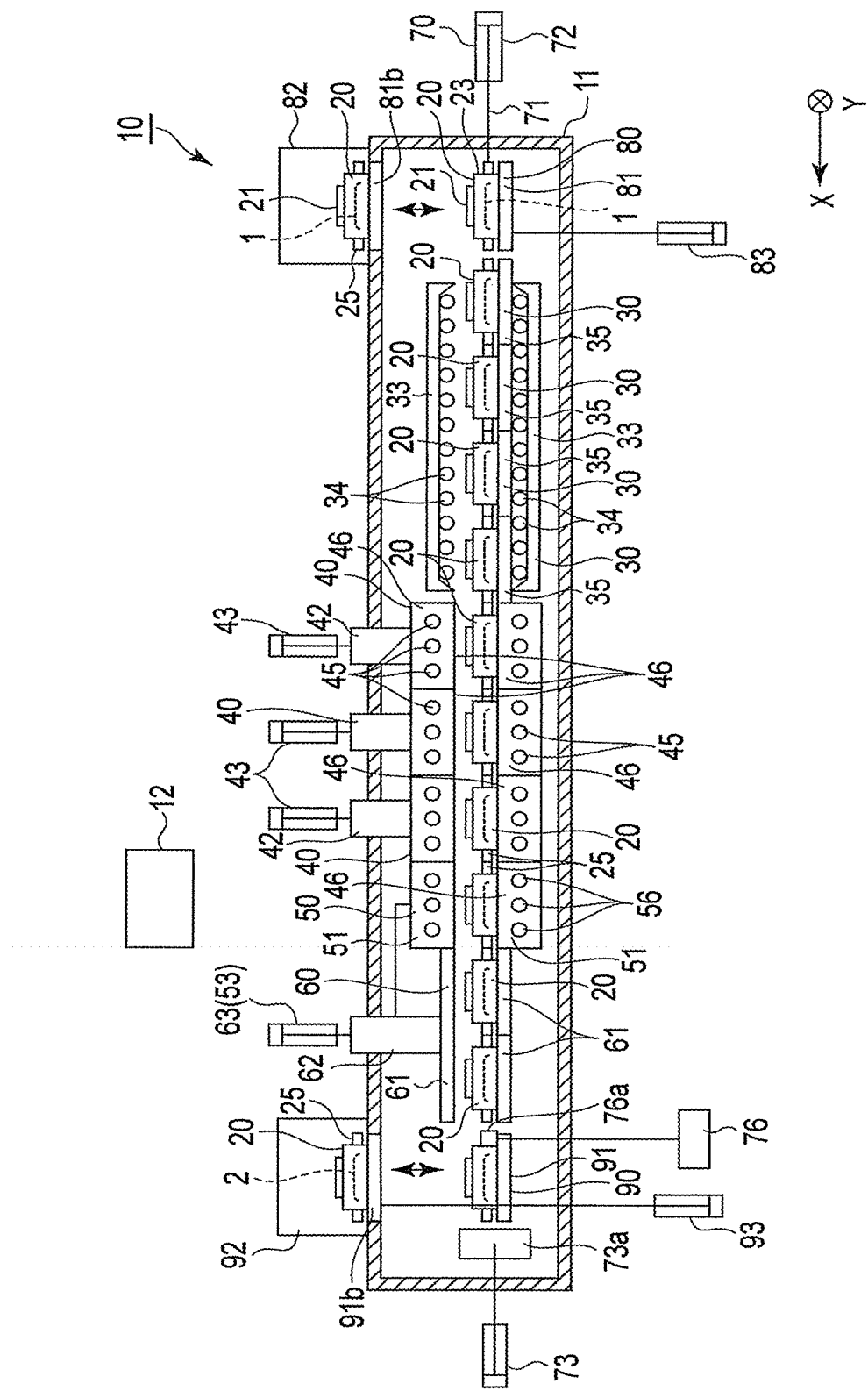
FIG. 2 is a side view schematically showing the configuration of the shape forming system.
Figure 3:
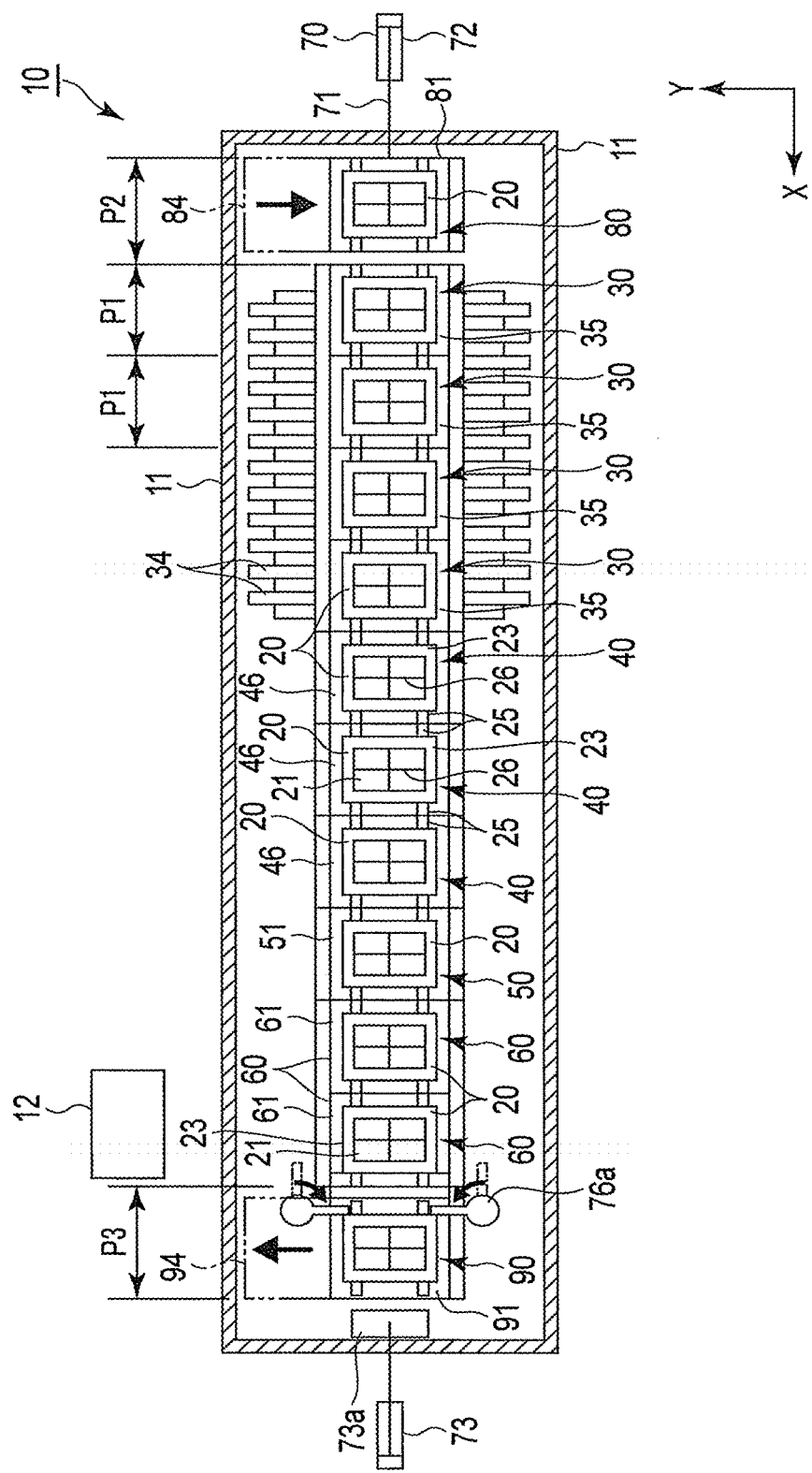
FIG. 3 is a plane view schematically showing the configuration of the shape forming system.
Figure 4:
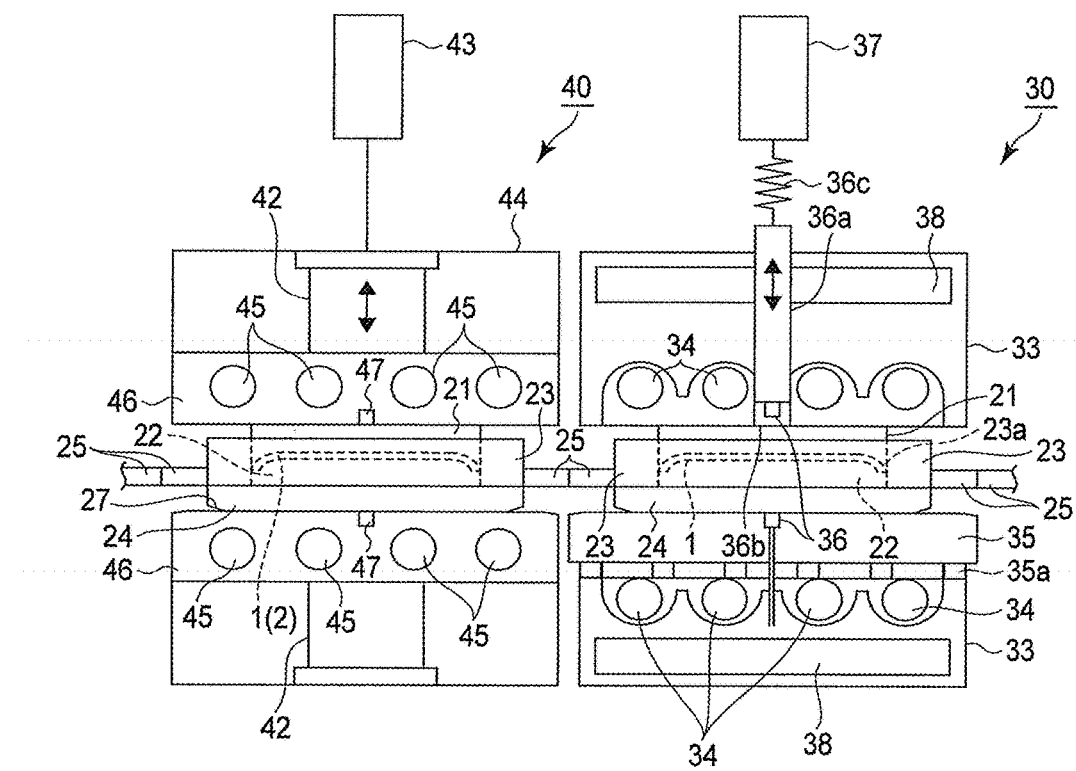
FIG. 4 is an explanatory view showing a heating unit and pressing unit of the shape forming system.

As shown in FIGS. 1 to 3, the shape forming system 10 is provided with mold assemblies 20, pressing units 40, heating units 30, slow cooling unit 50 (cooling unit), rapid cooling units 60 (cooling units), conveyance unit 70, carry-in unit 80, carry-out unit 90, isolation chamber 11, and control section 12.

The mold assembly 20 retains the to-be-formed material 1 or the shaped product 2 serving as a shaped product. The pressing unit 40 applies pressure to the mold assembly 20 to subject the to-be-formed material 1 to a press forming treatment. The heating unit 30 heats the mold assembly 20 prior to the press forming treatment to subject the to-be-formed material 1 to a heating treatment. The slow cooling unit 50 subjects the shaped product 2 after being subjected to the forming treatment by the pressing unit 40 to a slow cooling treatment while keeping the pressure of the shaped product 2. The rapid cooling unit 60 subjects the shaped product 2 after being subjected to slow cooling to rapid cooling. The conveyance unit 70 conveys the mold assembly 20. The carry-in unit 80 and the carry-out unit 90 are provided at respective ends of a conveyance path A along arrows in FIG. 1. The isolation chamber 11 accommodates therein these units 20, 30, 40, 50, 60, 70, 80, and 90, and isolates the units from the external atmosphere. The control section 12 controls operations of the units 20, 30, 40, 50, 60, 70, 80, and 90, and the isolation chamber 11.

The heating station in which a plurality of heating units 30 are consecutively arranged in parallel with each other, the pressing station in which a plurality of pressing units 40 are consecutively arranged in parallel with each other, the slow cooling station in which the slow cooling unit 50 is arranged, and the rapid cooling station in which the rapid cooling units 60 are arranged are arranged along the conveyance path.

Plates on the lower side of the units in each station are consecutively arranged in parallel with each other along the conveyance path. On the line of the plates, a pathway for passage of the mold assemblies 20 is formed. A plurality of mold assemblies 20 are consecutively moved from the upstream side to the downstream side along the pathway on the line of the plates.

The isolation chamber 11 is formed into a shape of a box such as a substantially rectangular parallelepiped-like shape, and an enclosed space is formed inside. A vacuum pump capable of exhausting a gas inside the isolation chamber 11, and a nitrogen gas supply unit configured to supply nitrogen gas are connected to the isolation chamber 11. Thereby, the isolation chamber 11 is constituted in such a manner that the gas inside the isolation chamber 11 can be displaced by a vacuum atmosphere in a state where the atmosphere is isolated from the atmosphere of the earth or by an inert gas atmosphere so that the mold assembly 20 to be heated at a high temperature can be prevented from being oxidized.

The plurality of units 30, 40, 50, and 60 are sequentially arranged in parallel from one end side (right side in FIG. 1) in the conveyance direction along the x-axis in the order of the carry-in unit 80, four heating units 30, three pressing units 40, one slow cooling unit 50, two rapid cooling units 60, and carry-out unit 90 at regular intervals (unit pitches) P1. These units, 30, 40, 50, and 60 are configured in such a manner that they can be rearranged or increased/decreased in number.

Figure 5:
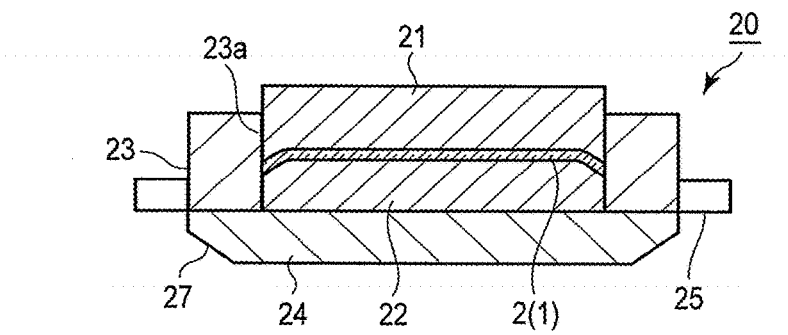
FIG. 5 is a cross-sectional view showing a mold assembly of the shape forming system.
Figure 6:
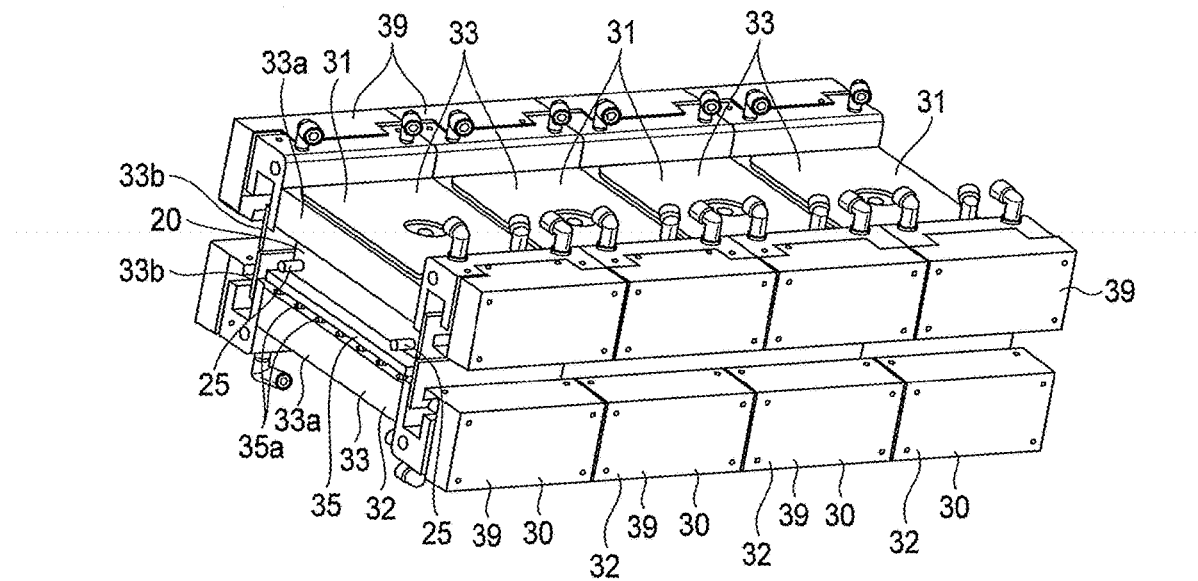
FIG. 6 is a perspective view showing a heating station of the shape forming system.
Figure 7:
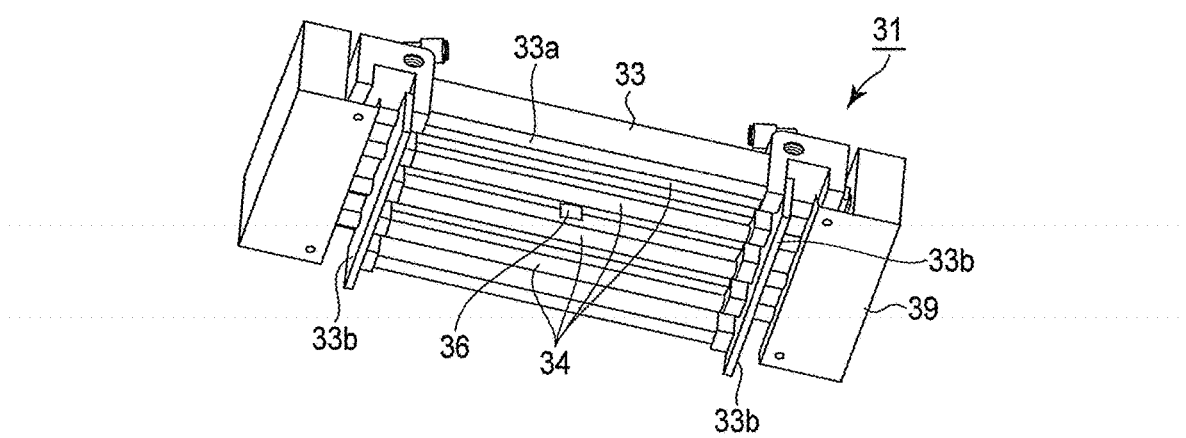
FIG. 7 is a perspective view showing the structure of an upper heater section of the heating station of the shape forming system.
Figure 8:
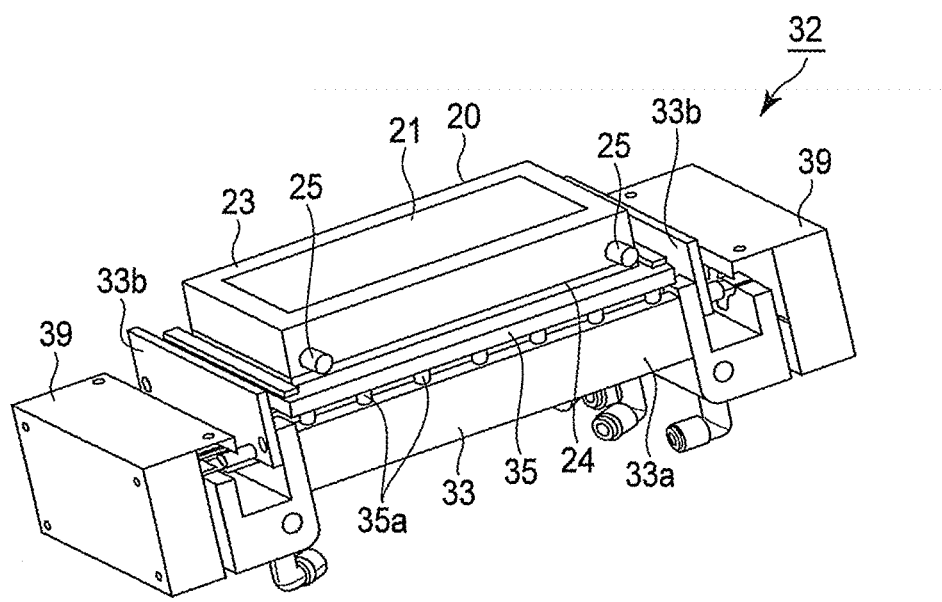
FIG. 8 is a perspective view showing the structure of a lower heater section of the heating station of the shape forming system.
Figure 9:
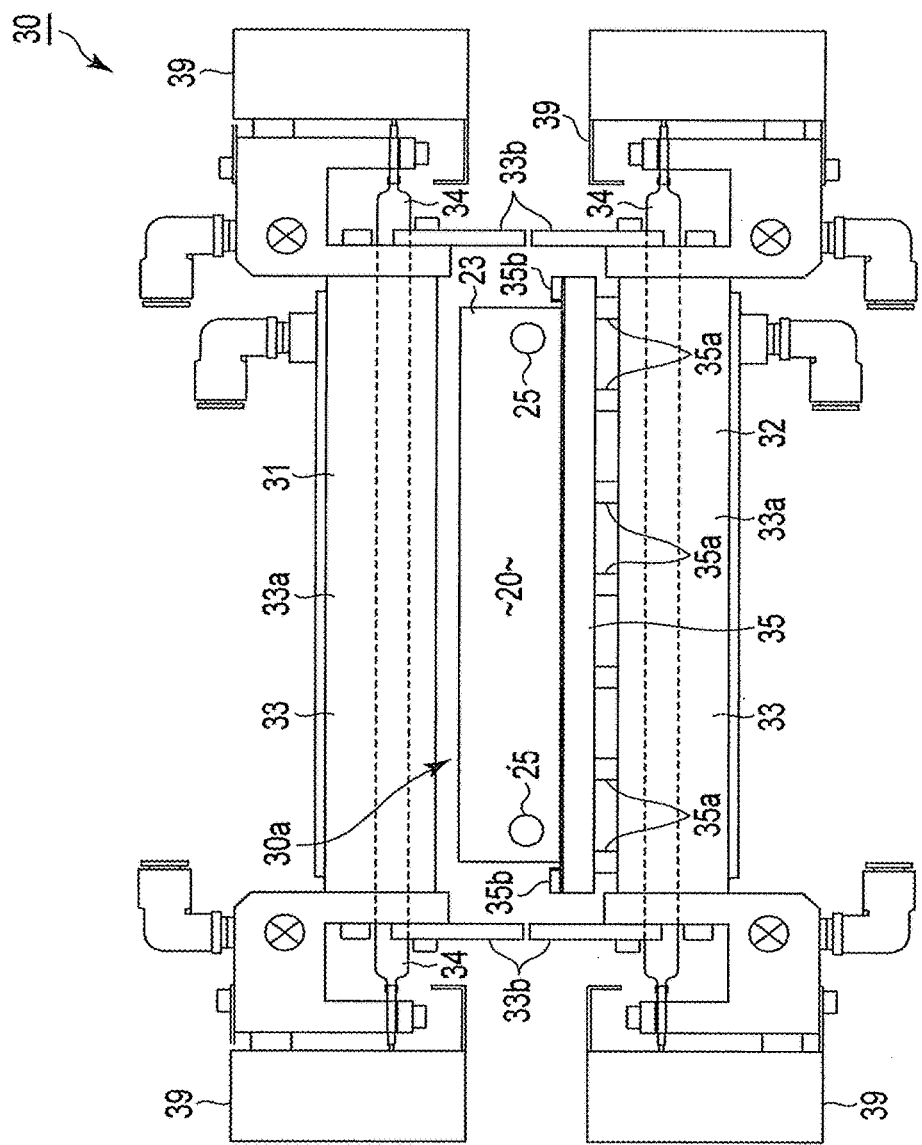
FIG. 9 is an explanatory view of the heating unit of the shape forming system viewed from the conveyance direction.
Figure 10:
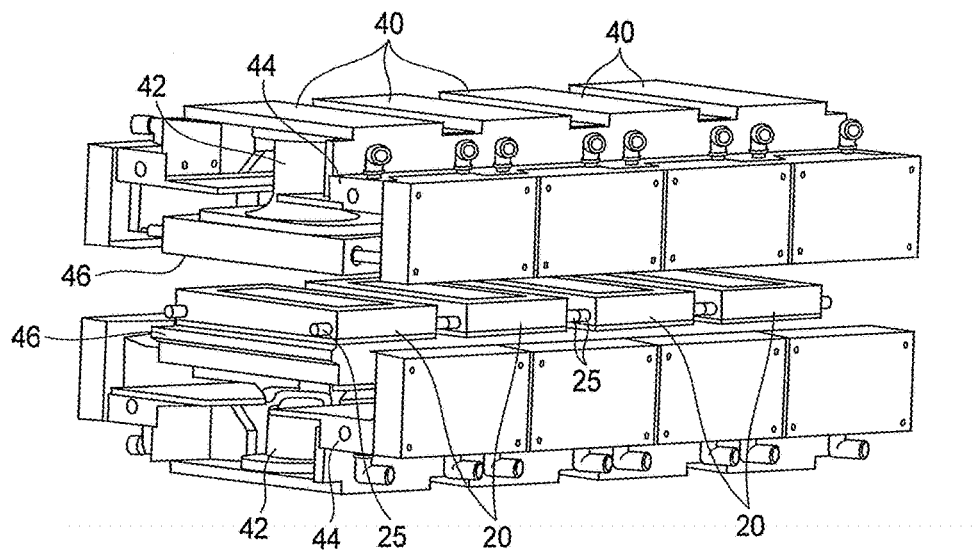
FIG. 10 is a perspective view showing a pressing station of the shape forming system.
Figure 11:
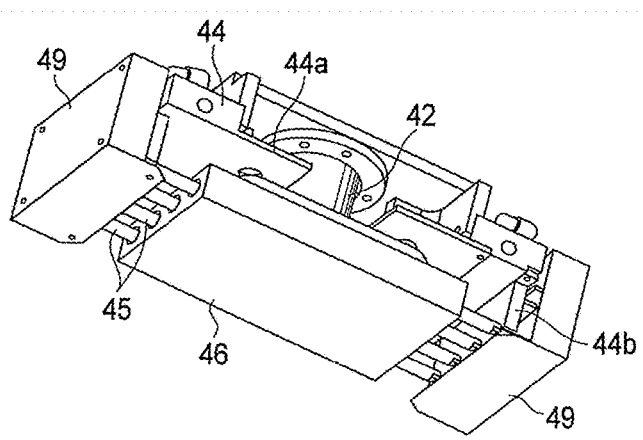
FIG. 11 is a perspective view showing the structure of an upper part of the pressing unit.
Figure 12:
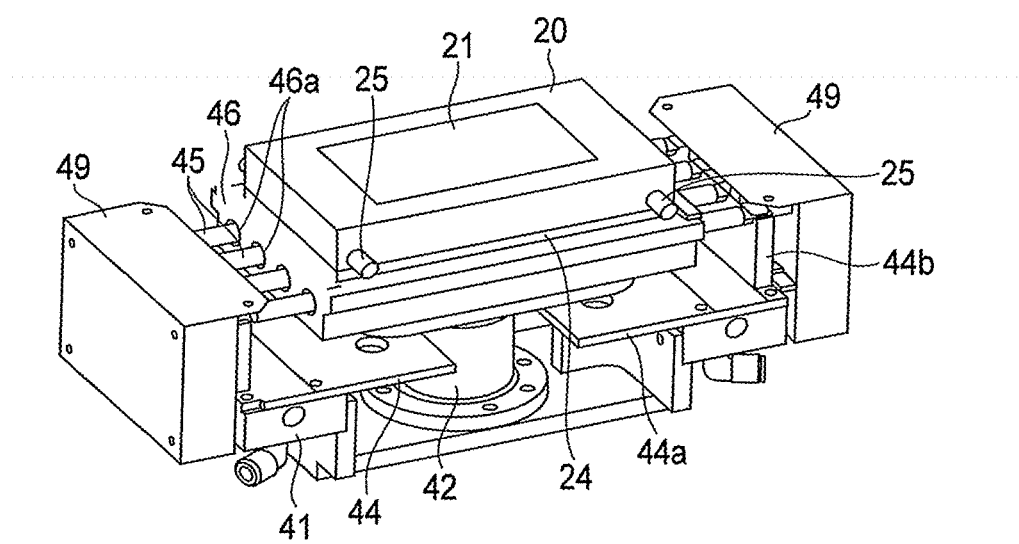
FIG. 12 is a perspective view showing the structure of a lower part of the pressing unit.
Figure 13:
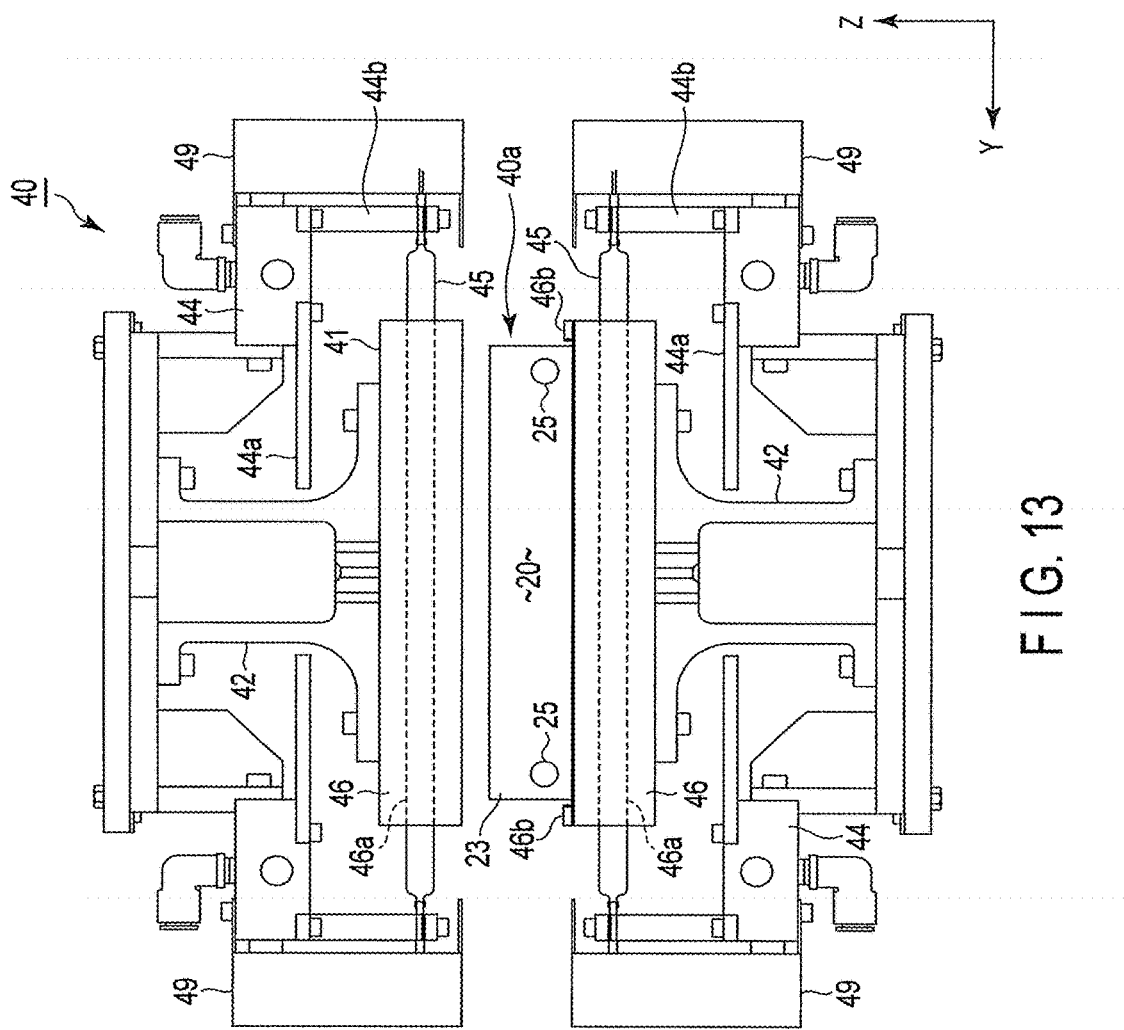
FIG. 13 is an explanatory view of the pressing unit of the shape forming system viewed from the conveyance direction.

As shown in FIG. 1 and FIG. 5, each mold assembly 20 is provided with an upper mold 21 (upper member), lower mold 22 (lower member), sleeve 23, and die plate 24. The upper mold 21 is formed in accordance with the upper side shape of the shaped product 2. The lower mold 22 is arranged in opposition to the upper mold 21, and is formed in accordance with the lower side shape of the shaped product 2. The sleeve 23 surrounds and supports the outer side of each of the upper mold 21 and lower mold 22. The die plate 24 supports the lower side of the lower mold 22. The sleeve 23 may be fixed to the die plate 24 by means of bolts or the like. Further, the sleeve 23 and the die plate 24 may be integrated with each other.

The upper mold 21 and the lower mold 22 form a rectangular shape of a predetermined size having a cavity corresponding to the shape of the shaped product in the closed state. As the material for the upper mold 21 and lower mold 22, a material excellent in thermal resistance and having high temperature material strength is used. For example, carbon, glasslike carbon, cemented carbide, SiC, and the like are used.

Both the upper mold 21 and the lower mold 22 are inserted in the rectangular sleeve 23 and are supported thereby. Between the upper mold 21 and lower mold 22, for example, a plate-like to-be-formed material 1 is arranged.

In each of the top surface of the upper mold 21 and undersurface of the die plate 24, air-bleeding grooves 26 are formed in the shape of a cross. By the grooves 26, it becomes possible to prevent the top surface of the upper mold 21 and the undersurface of the die plate 24 from sticking to the plates 81, 35, 46, 51, 61, and 91, thus improving the conveyance performance. It should be noted that when a sticking mechanism is used for carry-in or carry-out or in a similar case, the grooves 26 may be omitted as the need arises.

The sleeve 23 is formed into a rectangular frame-like shape and, in the central part thereof, an installation section 23a in which the upper mold 21 and the lower mold 22 are inserted and held is formed.

On each of both end faces of the sleeve 23 in the conveyance path direction, a pair of coupling pins 25 (coupling section) protruding in the conveyance direction is formed. The coupling pins 25 are axial bodies formed of a material having low thermal conductivity, such as silicon nitride ($Si_3N_4$), stainless steel or the like. Coupling pins 25 arranged in adjoining units collide against each other to become continuous in the conveyance direction, whereby the shoving force generated from the conveyance unit 70 to be described later is transmitted. Regarding the coupling pins 25, two coupling pins 25 arranged in the width direction of one unit are provided on, for example, both sides of one unit in the conveyance direction, i.e., four coupling pins 25 in total are provided in one unit.

At both ends of the underside of the die plate 24 in the conveyance direction, guide sections 27 each having a tapered surface inclined with respect to both the vertical direction and conveyance direction are formed. The guide section 27 is set to an inclination of, for example, 10 to 20 degrees. By the guide sections 27, shoving conveyance of a mold assembly 20 is carried out smoothly between top surfaces of plates of adjoining units.

The length of the sleeve 23 in the conveyance direction including the coupling pins 25 on both sides is set to a length identical to the unit pitch P which is the interval between the units, i.e., the carry-in unit 80, heating unit 30, pressing unit 40, slow cooling unit 50, rapid cooling unit 60, and carry-out unit 90. That is, the units are configured in such a manner that coupling pins 25 of mold assemblies 20 placed on adjoining units abut on each other to become continuous with each other.

It should be noted that as a configuration affiliated to the shape forming system 10, dummy mold assemblies 20A are provided in a required number separately from the mold assemblies 20. The dummy mold assembly 20A is constituted of, for example, a block 28 having an external shape identical to the mold assembly 20. The dummy mold assembly 20A is delivered to each unit in place of the mold assembly 20 when the shape forming system 10 is stopped, when the operation is terminated or after the operation is started, and is subjected to treatment. Futile use of the mold assembly 20 is avoided during preheating of the shape forming system 10 or when the system 10 is stopped, whereby cost is reduced, and the mold assembly 20 is prevented from being worn. The dummy mold assembly 20A includes a block 28 and coupling pins 25. The block 28 is heated in a manner similar to the manner in which the mold assembly 20 is heated, and is hence constituted of a material having high thermal resistance. The coupling pin 25 is constituted of an axial member formed of a material having low thermal conductivity, such as silicon nitride, stainless steel or the like. Mold assemblies 20 and dummy mold assemblies 20A of a plurality of units arranged in parallel with each other are configured in such a manner that they can be conveyed collectively.

As shown in FIGS. 4 to 9, each of a plurality of heating units 30 arranged in parallel with each other in the conveyance direction is provided with an upper heater section 31 and lower heater section 32, which are arranged above and below the mold assembly 20 in such a manner that the mold assembly 20 is interposed between the heater sections 31 and 32. Between the upper heater section 31 and lower heater section 32, a passage 30a through which the mold assembly 20 can pass is formed.

Each of the upper heater section 31 and the lower heater section 32 includes, for example, a heater supporting section 33 configured to support a heater mechanism.

Each of the heater supporting sections 33 is formed of $Si_3N_4$ or the like, is constituted of a base section 33a to be arranged above or below infrared lamps 34, and reflection walls 33b vertically provided on both sides of the conveyance path, and is arranged in opposition to each other in the vertical direction.

Between the pair of heater supporting sections 33 arranged in opposition to each other, a tunnel-like passage 30a through which the mold assembly 20 can pass is formed, and ends of the reflection walls opposed to each other abut on each other or come close to each other to surround the passage. The upper and lower parts, and the outer side of the infrared lamps 34 are covered with the heater supporting sections 33. Thereby, it is possible to effectively heat the mold assembly 20 inside by the heat from the infrared lamps 34.

On each of the lower side of the upper side heater supporting 33 and the upper side of the lower side heater supporting section 33, a plurality of infrared lamps 34 serving as a heater mechanism are arranged and installed.

Each infrared lamp 34 is arranged in such a manner that an axial direction thereof is in the width direction of conveyance. Both ends of the each infrared lamp 34 is supported to the each heater supporting section 33 respectively. Each of the infrared lamps 34 is set in such a manner that the wattage density thereof at both ends thereof in the axial direction is greater than that at the center thereof. By using the infrared lamps 34, it becomes possible to make the rate of temperature increase high, and heat the mold uniformly. Further, uniform heating of the mold may be carried out by separately supplying power to the infrared lamps 34 arranged on both sides from those arranged on the inner side.

Above the lines of the lower side infrared lamps 34, a loading plate 35 on which the mold assembly 20 is to be placed is fixed. The loading plate 35 is constituted of a material having high thermal conductivity, such as SiC or the like, and is formed into a rectangular plate-like shape. The loading plate 35 is fixed to the heater supporting section 33 at a plurality of positions in the outer edge part thereof by means of fixing members 35a formed of a material having thermal insulation properties, such as silicon nitride. At lateral parts on both sides of the top surface of the loading plate 35 in the conveyance direction, protrusion bars 35b used for position regulation in the conveyance direction are formed.

The heating unit 30 is provided with thermocouples 36 configured to measure the temperature of the mold assembly 20 at upper and lower positions. The upper side thermocouple 36 is provide on a measurement board 36b supported at a lower part of a support shaft 36a arranged to penetrate the central part of the upper side heater supporting section 33. The support shaft 36a is a tubular axial member formed of, for example, $Si_3N_4$, and is connected to an elevating mechanism section 37 such as an air cylinder or the like through a spring member 36c having elasticity. The measurement board 36b is formed of a material such as WC, a W alloy or the like, and an undersurface thereof constitutes a contacting surface having a fixed area. The thermocouple 36 is passed through the support shaft 36a, and is welded to the measurement board 36b at a tip thereof. When the elevating mechanism section 37 is driven by the control of the control section 12, the thermocouple 36 can be moved vertically in the advance and retreat directions, and is brought into contact with or is separated from the top surface of each of the mold assemblies 20 consecutively conveyed to the heating unit 30. In the state where the contacting surface of the measurement board 36b is in contact with the top surface of the mold assembly 20, the thermocouple 36 detects the temperature of the mold assembly 20. At this time, surface contact securing a fixed area by using the measurement board 36b is achieved, whereby it becomes possible to uniform temperature measurement.

The lower side thermocouple 36 is inserted into the loading plate 35 on the lower side from the lateral position of the conveyance path to be provided inside the loading plate 35, and detects the temperature of the mold assembly 20 placed on the loading plate 35. The thermocouples 36 are connected to the control section 12, and the detected temperature information is used for feedback control in the control section 12.

On the outer side of the heater mechanism 34 of each of the upper and lower heater supporting sections 33, i.e., on the opposite side of the mold assembly 20 in each of the upper and lower part of the heating unit 30, a water jacket 38 is provided.

On the outer side of the upper and lower heater supporting sections 33, a pair of upper and lower cover sections 39 covering the outer peripheries of the heater supporting sections 33 is provided. The cover section 39 is formed of a material such as stainless steel or the like.

In the heating unit 30 configured as described above, each of the mold assemblies 20 conveyed in sequence to the heating unit 30 is subjected to a heating treatment in a state where the mold assembly 20 is placed on the loading plate 35 on the lower side. At this time, the thermocouple 36 is brought into contact with the mold assembly 20 by the elevating mechanism section 37, the temperature is detected by the upper and lower thermocouples 36, and the temperature is adjusted to the desired temperature by feedback control carried out by the control section 12 on the basis of the detected temperature. Each of the upper and lower infrared lamps 34 is subjected to temperature control employing the feedback control based on the temperature detected by the upper and lower thermocouples 36.

As shown in FIGS. 10 to 13, each of a plurality of pressing units 40 arranged in parallel with each other in the conveyance direction is provided with a pair of upper and lower heater sections 41 arranged to sandwich the mold assembly 20 in between them, upper and lower press shafts 42, and elevating drive shaft 43 connected to the upper side press shaft 42.

An upper side heater supporting section 44 is fixed in such a manner that the section 44 can be moved together with an upper side press plate 46. Each of the press plates 46 is formed into a rectangular plate-like shape, and is formed of a material excellent in thermal conductivity and hardness, such as cemented carbide, SiC or the like. In each of the press plates 46, insertion holes 46a used for the heater are formed, and infrared lamps 45 are inserted in the holes 46a.

At lateral parts on both sides of the top surface of the lower side press plate 46 in the conveyance direction, protrusion bars 46b used for position regulation in the conveyance direction are formed.

To each of the upper side of the upper press plate 46 and the underside of the lower press plate 46, a press shaft 42 is connected.

The upper press shaft 42 is connected to an elevating mechanism section 43 such as a servo motor, air cylinder or the like, and is configured to move up and down in accordance with the control of the control section.

Each of the upper and lower press plates 46 is provided with a thermocouple 47. Each thermocouple 47 is inserted into the press plate 46 from the lateral position of the conveyance path to be provided inside the press plate 46, and detects the temperature of the mold assembly 20. Each thermocouple 47 is connected to the control section 12, and the detected temperature information is used for feedback control in the control section 12.

On the outer side of the infrared lamps 45 of each of the upper and lower heater supporting sections 44, i.e., on the opposite side of the mold assembly 20, a water jacket is provided.

On the outer side of each of the upper and lower heater supporting sections 44, a pair of upper and lower cover sections 49 covering the outer peripheries of the heater supporting sections 44 are provided.

In the pressing unit 40 configured as described above, the mold assembly 20 placed between the pair of plates 46 is subjected to a heating treatment using the infrared lamps 45 and a pressing treatment by applying pressure to the mold assembly 20 placed between the pair of press plates 46 by the vertical movement of the upper press plate 46, i.e., by lowering the upper press plate 46. At this time, the temperature is detected by the upper and lower thermocouples 47, and the temperature is adjusted to the desired temperature by feedback control based on the detected temperature. Further, a press detection section such as a load cell or the like is provided, and feedback control is carried out so that a predetermined pressing force can be obtained.

As shown in FIG. 1, and FIG. 2, the slow cooling unit 50 arranged in parallel with other units is constituted of upper and lower slow cooling plates 51 (cooling section) arranged above and below the mold assembly 20 to sandwich the mold assembly 20 in between them, and elevating mechanism section 53 such as a servo motor, air cylinder or the like to be connected to the upper slow cooling plate 51.

Each of the upper and lower slow cooling plates 51 is formed into a rectangular plate-like shape, and is formed of a material excellent in thermal conductivity and hardness, such as cemented carbide, SiC or the like.

In each of the upper and lower slow cooling plates 51, infrared lamps 56 serving as a slow cooling heater mechanism are incorporated. A path through which the mold assembly 20 passes is formed between the upper and lower slow cooling plates 51. Each of the upper and lower slow cooling plates 51 is provided with a plurality of thermocouples.

The lower slow cooling plate 51 is constituted in the same manner as the lower press plate 46, and protrusion bars used for position regulation are formed thereon.

To the upper slow cooling plate 51, a press shaft is connected in the same manner as the upper press plate 46, and is configured in such a manner that the upper slow cooling plate 51 can be moved up and down by an elevating mechanism section 63. It should be noted that in this embodiment, the upper side press shaft is moved up and down in synchronism with a support shaft 62 of the rapid cooling unit 60, hence the common elevating mechanism section 63 is used. However, the elevating mechanism section is not limited to this, and an elevating mechanism section may be provided separately.

The upper side slow cooling plate 51 is lowered by the elevating mechanism section 63 to apply pressure to the mold assembly 20 placed on the lower side slow cooling plate 51, thereby carrying out slow cooling treatment while carrying out pressure keeping of maintaining a fixed pressing force. At this time, the temperature detected by the thermocouples is feedback-controlled by the control section 12 and adjusted to the desired temperature. Further, a press detection section is provided and the pressing force is adjusted to the predetermined pressing force.

As shown in FIG. 1 and FIG. 2, the rapid cooling unit 60 serving as a second cooling unit is constituted of upper and lower cooling plates 61 (cooling section) arranged above and below the mold assembly 20 to sandwich the mold assembly 20 in between them, support shaft 62 coupled to the upper cooling plate 61 and extending in the vertical direction, and elevating mechanism section 63 such as a servo motor, air cylinder or the like to be connected to the upper cooling plate 61.

Each of the upper and lower cooling plates 61 is formed into a rectangular plate-like shape, and is formed of a material excellent in thermal conductivity and hardness, such as cemented carbide, SiC, quenched stainless steel or the like. In each of the cooling plates 61, refrigerant piping constituting a flow path through which a cooling medium is made to flow is incorporated. Further, each of the upper and lower cooling plates 61 is provided with a plurality of thermocouples. Furthermore, the upper cooling plate 61 is configured to be able to move up and down by means of the elevating mechanism section 63.

The elevating mechanism section 63 is driven to lower the upper cooling plate 61, bring the upper cooling plate 61 into contact with the mold assembly 20 placed on the lower side cooling plate 61, and apply pressure to the mold assembly 20, whereby a rapid cooling treatment is carried out. At this time, the temperature measured by the thermocouples is fed back, and the temperature is lowered to the desired temperature.

As shown in FIGS. 1 to 3, the carry-in unit 80 is arranged on one end side in the conveyance direction, i.e., at a position adjacent to the heating unit 30 (right side in the drawing). The carry-in unit 80 is provided with a carry-in plate 81 configured to place the mold assembly 20 thereon and move the mold assembly 20 upwardly and downwardly, load lock chamber 82 provided at a position above the carry-in station, elevating mechanism section 83 configured to move the carry-in plate 81 in the vertical direction, and movement mechanism section 84 provided at a lateral part of the load lock chamber 82.

The carry-out unit 90 is arranged on the other end side in the conveyance direction, i.e., on the downstream side of the rapid cooling unit 60. The carry-out unit 90 is provided with a carry-out plate 91 configured to place the mold assembly 20 thereon and move the mold assembly 20 upwardly and downwardly, load lock chamber 92 provided at a position above the carry-out station, elevating mechanism section 93 configured to move the carry-out plate in the vertical direction, and movement mechanism section 94 provided at a lateral part of the load lock chamber 92.

To each of the load lock chambers 82, and 92, a nitrogen supply port and a nitrogen exhaust port are respectively connected. It is made possible to make the load lock chambers 82, and 92 nitrogen-substituted. The shape forming system 10 is structured in such a manner that it is possible to fetch the carry-in plate 81 or the carry-out plate 91 and the mold assembly 20 from the chamber 11 through the load lock chamber 82 or 92 without destroying the nitrogen atmosphere inside the chamber 11.

The movement mechanism section 84 is arranged at a lateral part of the load lock chamber 82 to be continuous with the chamber 82. By sliding the mold assembly 20 set to the movement mechanism section 84 in the Y direction in figure, the mold assembly 20 is set on the carry-in plate 81 located inside the load lock chamber 82.

The movement mechanism section 94 is arranged at a lateral part of the load lock chamber 92 to be continuous with the chamber 92. By sliding and moving the mold assembly 20 on the carry-out plate 91 in the load lock chamber 92 in the Y direction in figure, the mold assembly 20 is carried out to the movement mechanism section 94. Each of the movement mechanism section 84 and movement mechanism section 94 is a belt conveyor, and is configured to move the mold assembly 20. The mold assembly 20 may be moved not by using a belt conveyor but by using an air cylinder instead.

It should be noted that the setting position of the carry-in plate 81 is set at a fixed distance away from the setting position of the adjoining heating unit 30 on the downstream side, and the setting position of the carry-out plate 91 is set at a fixed distance away from the setting position of the adjoining rapid cooling unit 60 on the upstream side. Here, setting is made in such a manner that a separation interval of, for example, 20 mm can be maintained.

On the other hand, on both sides of the conveyance path on the upstream side of the setting position of the carry-out plate 91, a pair of movement mechanism sections 76 configured to shift the mold assembly 20 which has been conveyed thereto toward the downstream side by a fixed distance are provided. Each of the movement mechanism sections 76 includes an arm 76a configured to shove the sleeve 23 toward the downstream side by a fixed distance by, for example, rotation. The movement mechanism sections 76 shift the mold assembly 20 from the adjoining station toward the downstream side by a stroke length P3 greater than the unit pitch P1 by a fixed distance. Thereby, the movement mechanism sections 76 set the mold assembly 20 at the x coordinate position of the elevating position for the carry-out load lock chamber 92.

The mold assembly 20 is moved by a stroke length P3 greater than P1, whereby even when the mold assembly 20 is slid in the Y direction by the movement mechanism section 94, the mold assembly 20 can be moved without interfering with another mold assembly 20 placed on the rapid cooling unit 60.

Loading plates 35, press plates 46, slow cooling plate 51, and cooling plates 61 all of which are on the lower side of their corresponding units, carry-in plate 81, and carry-out plate 91 are arranged from one end side to the other end side in parallel with each other in such a manner that their top surfaces become continuous with each other along the predetermined conveyance path. The top surface of each plate is set at a position slightly lower than the adjoining top surface on the upstream side. For example, the adjoining top surfaces are arranged in parallel with each other with a step of about 0.1 to 1 mm, more desirably, 0.1 to 0.3 mm formed between each other. Accordingly, smooth conveyance is enabled by a simple configuration in which the mold assembly 20 has only to be shoved horizontally.

The conveyance unit 70 is provided with a cylinder shaft 71 reciprocating in the conveyance direction, conveyance air cylinder 72 serving as a shoving mechanism connected to the control section and configured to move the cylinder shaft 71 in the conveyance direction, and stopper section 73 configured to regulate the position of the mold assembly 20 on the downstream side in the conveyance direction.

The cylinder shaft 71 extends coaxially with the coupling pins 25. The conveyance air cylinder 72 is installed at an end part on the carry-in side of the isolation chamber 11, and has a function of shoving the coupling pins 25 in the conveyance direction with a fixed stroke. The mold assemblies 20 are shoved along the conveyance path concomitantly with the movement of the shoved coupling pins 25, whereby the plurality of mold assemblies 20 are collectively conveyed in sequence from one end side to the other end side with a fixed stroke.

The stopper section 73 is arranged in the vicinity of the end part on the carry-out side, and regulates the position of the mold assembly 20 on the downstream side at the time of conveyance.

The conveyance unit 70 is set in such a manner that the mold assembly 20 is shoved by a stroke length P2 greater than the unit pitch P1 by a fixed distance in order to shove the mold assembly 20 located at a carry-in position a fixed distance away from the adjoining unit.

P2 is greater than P1, hence the mold assembly 20 does not interfere with another mold assembly 20 in the heating unit when the mold assembly 20 is moved in the Y direction by the movement mechanism section 84.

Furthermore, outside the isolation chamber 11 of the shape forming system 10, a shaped product storage shed 13 configured to retain a plurality of shaped products 2, mold storage sheds 14 each configured to retain a plurality of mold assemblies 20 and dummy mold assemblies 20A, and material storage shed 15 configured to store therein to-be-formed materials 1 are provided.

Hereinafter, a procedure for manufacturing a shaped product 2 from a to-be-formed material 1 by using the shape forming system 10 according to this embodiment will be described. An example of the shaped product 2 is a cover glass for a smartphone having a size of 4 to 12 in. and thickness of about 0.3 to 1.5 mm. However, the example is not limited to this, and the shape forming system 10 can be applied to various types of shapes and uses. For example, it is also possible to manufacture a shaped product 2 having a shape in which both the end parts are curved or a shape in which the thickness of the end part changes.

In the shape forming system 10, a mold assembly is arranged in each unit, and a plurality of treatment items in a plurality of units are simultaneously carried out. However, hereinafter, the procedure will be described based on one mold, for the sake of convenience.

That is, in one unit, a treatment for one mold assembly 20 is carried out and, in another treatment unit, a treatment for another mold assembly 20 is carried out. In FIGS. 1 to 2, a case where one mold assembly 20 is arranged in each unit is shown.

As the carry-in treatment, first, a mold assembly 20 is set inside the load lock chamber 82, and then the load lock chamber 82 is closed. Next, the mold assembly 20 is lowered by using the elevating mechanism section 83. After the mold assembly 20 is lowered, the mold assembly 20 is moved horizontally by the movement mechanism section 84 to a position at which shoving is carried out by the conveyance unit 70.

At a predetermined timing at which treatment of another unit such as the heating unit 30 or the like has been completed, the control section 12 drives the cylinder shaft 71 to thereby press the coupling pins 25 of the mold assembly 20, move the mold assembly 20 toward the downstream side by a pitch P2 obtained by adding a fixed distance to the unit pitch P1, and move the mold assembly 20 to a position on the loading plate 35 of the first heating unit 30 (conveyance treatment). At the same time, a plurality of mold assemblies 20 queued in line on the downstream side are also shoved by the coupling pins 25, and are moved toward the downstream side by a unit pitch P1. That is, coupling pins 25 of a plurality of mold assemblies shove the mold assemblies 20 on the downstream side, hence the cylinder shaft 71 moves the mold assemblies 20 at one time. At this time, a plurality of plates 35, 46, 51, and 61 on the lower side are consecutively arranged with their heights slightly lowered from one plate to the next plate in sequence toward the downstream side, hence smooth movement is enabled.

In the first heating unit 30, the mold assembly 20 is heated by the upper and lower infrared heaters 34, and the to-be-formed material 1 is softened at a predetermined temperature (heating treatment). At a timing at which the plurality of treatment items carried out in parallel with the heating treatment have been completed, the mold assemblies 20 are sent to the downstream side in sequence by the conveyance treatment identical to that described above, and are subjected to the heating treatment in an identical manner.

Next, the plurality of mold assemblies 20 are collectively moved toward the downstream side by an identical conveyance treatment, and the mold assembly 20 is conveyed to the first pressing unit 40 from the heating unit 30 on the downstream side.

The control section 12 drives the elevating mechanism section 43 of the pressing unit 40 to lower the upper side press plate 46 and squeeze the mold assembly 20 between the upper and lower press plates 46, thereby subjecting the to-be-formed material 1 to press forming while heating the to-be-formed material 1 (pressing treatment). At a timing at which the plurality of treatment items carried out in parallel with the pressing treatment have been completed, the mold assemblies 20 are sent to the downstream side in sequence by the conveyance treatment identical to that described above, and are subjected to the pressing treatment by the pressing unit 40 on the downstream side in an identical manner.

Subsequently, by an identical conveyance treatment, the mold assembly 20 is conveyed from the pressing unit 40 on the downstream side to the first slow cooling unit 50. In the slow cooling unit 50, treatment is carried out in such a manner that the mold assembly 20 is kept at a predetermined temperature by, for example, temperature regulation of the heater while keeping the pressure by means of the pair of slow cooling plates 51 (slow cooling treatment).

Subsequently, by the conveyance treatment identical to that described above, the mold assembly 20 is conveyed from the slow cooling unit 50 to the rapid cooling unit 60. The control section 12 drives the elevating mechanism section 63 of the rapid cooling unit 60 to lower the upper side cooling plate 61 and squeeze the mold assembly 20 between the upper and lower cooling plates 61, thereby cooling the mold assembly 20 by means of the refrigerant to within a temperature region in which the shaped product is not oxidized even in atmospheric air (rapid cooling treatment).

Subsequently, the carry-out treatment is carried out. As the carry-out treatment, first, the mold assembly 20 is moved toward the downstream side by a distance P3 by means of the movement mechanism section 76, and is thereafter moved horizontally to a position directly under the load lock chamber 92 by means of the movement mechanism section 94. Thereafter, the mold assembly 20 is moved upwardly by the elevating mechanism section 93. When the mold assembly 20 is moved to the load lock chamber 92, the load lock chamber 92 is opened, and the mold assembly 20 is taken out.

It should be noted that the mold assembly 20 taken out of the load lock chamber 92 is disassembled outside the isolation chamber, and the shaped product 2 thus taken out is stored in the shaped product storage shed 13. A new to-be-formed material 1 is set to the mold assembly 20 already used, and the above-mentioned shape forming treatment is carried out again.

The above description is associated with the treatment procedure for the mold assembly 20 in which a to-be-formed material 1 is held. However, apart from this, in the shape forming method according to this embodiment, until each unit reaches a fixed temperature at the time of start of operation, at the time of shutdown, after completion or the like of shape forming of a required number of shaped products, dummy mold assemblies 20A are set, and treatment items of conveyance, heating, pressing, slow cooling, rapid cooling, and the like are carried out in an identical manner. In the collective conveyance, the mold assembly 20 itself fulfills part of the conveyance function, and all the stations require the mold assemblies 20, hence when it is desired to take out a mold assembly 20 or when it is desired to reduce the number of the mold assemblies 20, the conveyance function can be secured by arranging the dummy mold assemblies 20A in place of the mold assembly or the mold assemblies 20.

According to the shape forming system 10 associated with this embodiment, the following advantages are achieved. That is, in the mold assembly 20, coupling pins 25 protruding in the conveyance direction are provided and are made continuous with other coupling pins 25, whereby it is possible to improve the treatment efficiency by collectively conveying a plurality of mold assemblies 20.

Further, the coupling pins 25 are formed of a heat-insulating material, whereby it is possible to maintain the heat characteristics of each unit independently of each other.

A plurality of units can be added or removed for adjustment, hence it is easily possible to realize appropriate design corresponding to the shaped product.

Further, in the elevating operation of each of the pressing unit 40, slow cooling unit 50, and rapid cooling unit 60, driving is carried out by using only the upper shaft, whereby it becomes possible to carry out conveyance without waiting for the return to origin of the shaft. That is, in the above embodiment, the configuration is such that the mold assembly 20 is moved by being slid on the plates on the lower side, hence it is possible to reduce the standby time and improve the yield cycle time by maintaining the positions of the plates on the lower side, and carrying out elevating operations only on the upper side.

Infrared lamps are used as a heater mechanism, whereby a quick temperature rise and heating uniformity can be secured. Further, by adjusting the wattage of the infrared lamps, it is possible to eliminate temperature unevenness between the outer part and inner part of the mold, and realize uniform heating. It should be noted that in the above embodiment, the direction perpendicular to the conveyance direction is the axial direction, and the wattage in the axial direction is adjusted. However, the configuration is not limited to this and, in place of the above or in addition to the above, by adjusting the wattage of infrared lamps arranged in parallel in a plurality of lines, it becomes possible to realize uniform heating also in the conveyance direction.

It should be noted that the present invention is not limited to the embodiments described above, and can be appropriately modified and implemented.

Figure 14:
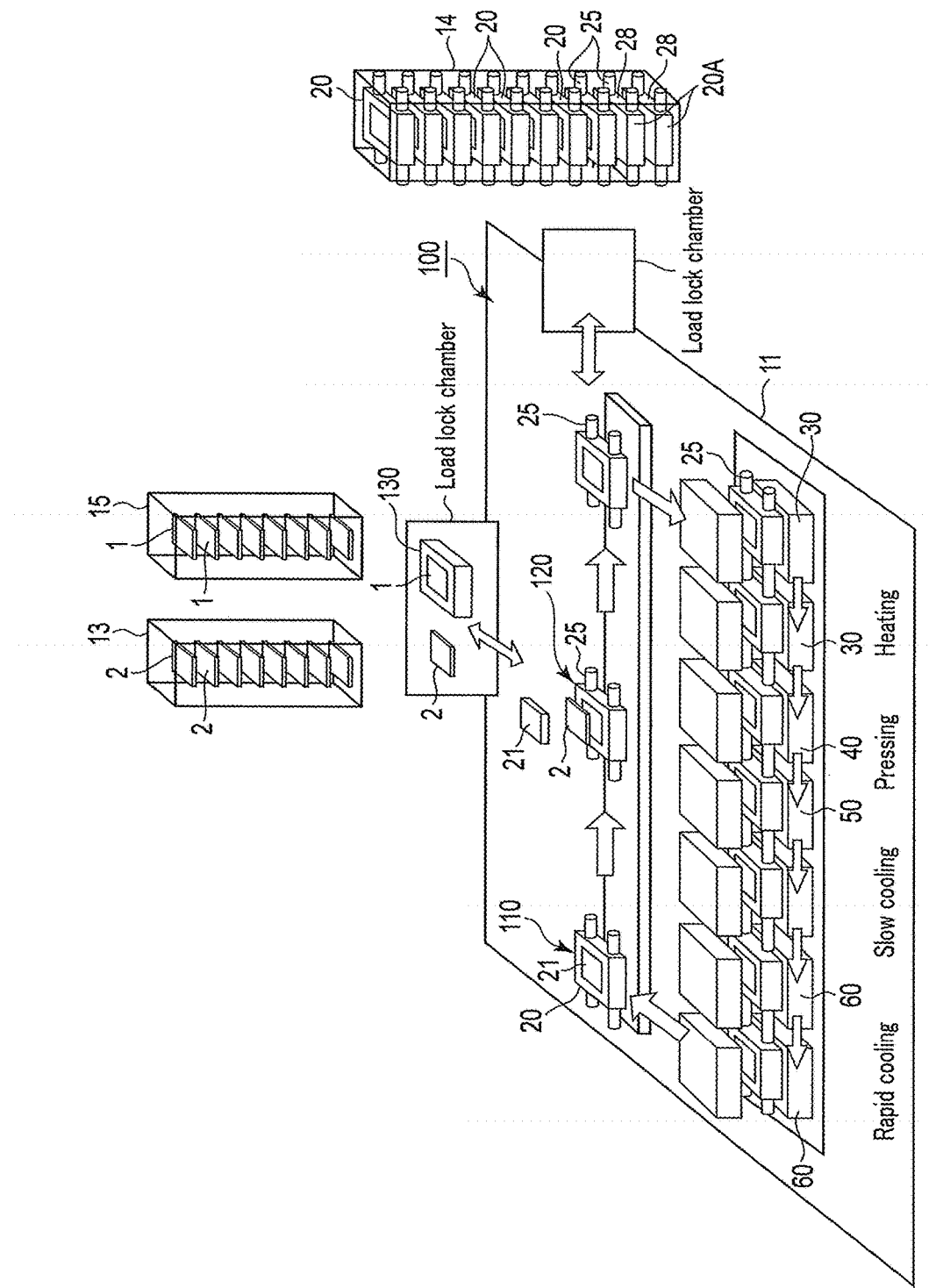
FIG. 14 is an explanatory view showing a shape forming system according to another embodiment.

For example, in a shape forming system 100 shown in FIG. 14 as another embodiment, the configuration in which takeout of the shaped product 2 and setting of the to-be-formed material 1 are carried out inside the isolation chamber 11 is employed. The shape forming system 100 is further provided with, inside the isolation chamber 11, in addition to the units 30 to 60 of the shape forming system 10 of the above first embodiment, a disassembling unit 110 configured to disassemble the mold assembly 20, setting unit 120 configured to set the to-be-formed material 1 and assemble the mold assembly 20, and preheating mechanism 130 configured to preheat the material.

As the treatment procedure (shape forming method) of the shape forming system 100 according to this embodiment, the mold assembly 20 is conveyed to the disassembling unit 110 in the chamber 11 after being subjected to rapid cooling, the mold assembly 20 is then disassembled, and the shaped product 2 is taken out. The shaped product 2 taken out of the mold assembly 20 is arranged in a storage such as a storage shed 13 located outside the chamber 11 through the load lock chamber.

Next, the disassembled mold assembly 20 is sent to the setting unit 120, and another to-be-formed material 1 is set thereto again. The new to-be-formed material 1 is preheated in advance to a predetermined temperature in the preheating mechanism 130.

It should be noted that at the time of exchange or maintenance of the mold, at the time of shutdown, and the like, the mold assembly 20 is moved to a mold storage shed 14 arranged outside the chamber 11 through the load lock chamber, and another dummy mold assembly 20A is set in place of the removed mold assembly 20.

According to this embodiment, by carrying out takeout of the shaped product and setting of the to-be-formed material inside the same chamber, the material and the shaped product can be exchanged in a state where the mold is at a comparatively high temperature, hence it is possible to shorten the cycle time by a length of time corresponding to the cooling time. Further, the number of molds to be used can be reduced, hence the mold cost can be reduced.

In the first embodiment described above, carry-in, heating, pressing, cooling, and carry-out are carried out in the state where the upper mold 21 and the lower mold 22 are assembled into a mold assembly 20. However, the procedure is not limited to this. For example, as the mold assembly 20 to be conveyed, an assembly in which the lower mold 22 holding the to-be-formed material 1 thereon is held by the sleeve 23 may be used, and the upper mold 21 may be provided on each of the upper side plates 46 and 51 of the pressing unit 40, and slow cooling unit 50 configured to carry out pressure keeping. In this case, it is possible to carry out carry-in and heating of the mold assembly 20 in a state where the upper side of the mold assembly 20 is opened, carry out fitting and pressing treatment by lowering the press plate 46 on which the upper mold 21 is fixed, and carry out fitting and pressure keeping by lowering the slow cooling plate 51 on which the upper mold 21 is fixed in a similar manner, and hence the number of the upper molds 21 to be used can be reduced.

Figure 15:
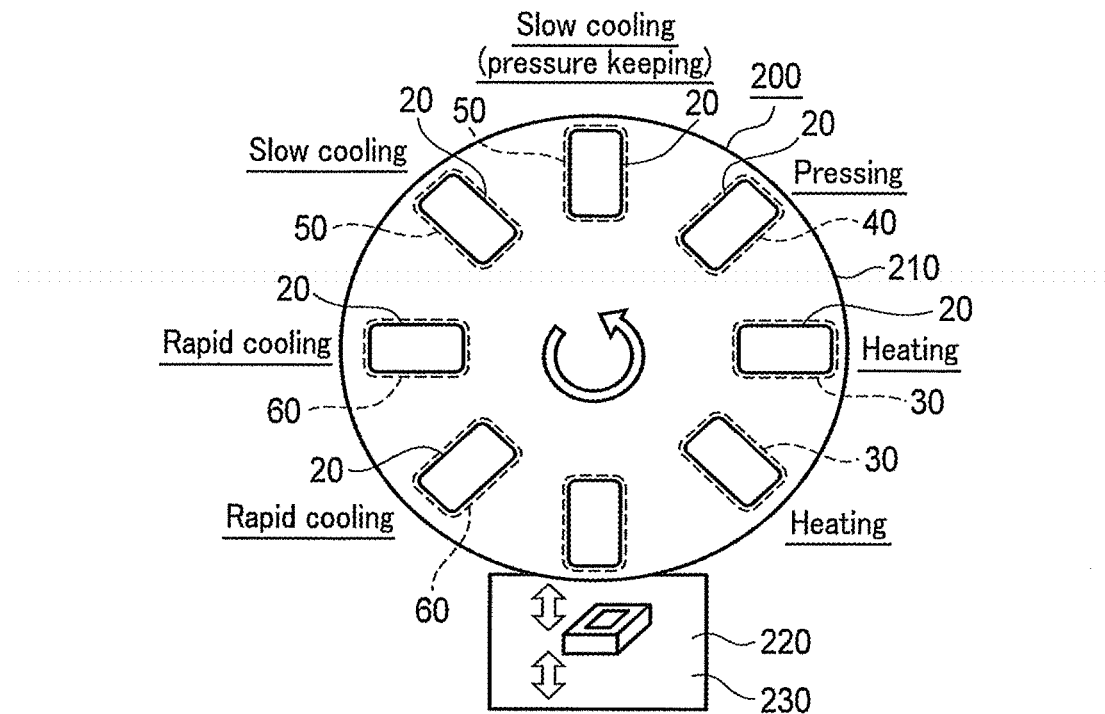
FIG. 15 is an explanatory view showing a shape forming system according to still another embodiment.

In the first embodiment described above, the case where the linear conveyance path in one direction is set is exemplified. However, the configuration is not limited to this. For example, in a shape forming system 200 shown in FIG. 15 as another embodiment, the conveyance path is made circular, mold assemblies 20 are set in a circular form on a rotary table 210 to be rotated, and treatment units are installed along the conveyance path. By such a structure, conveyance of the mold assemblies 20 can be made unnecessary. Further, in the shape forming system 200, conveyance strokes are reduced by setting the carry-in section 220 and the carry-out section 230 at the same position, whereby the number of necessary molds can be reduced.

Figure 16:
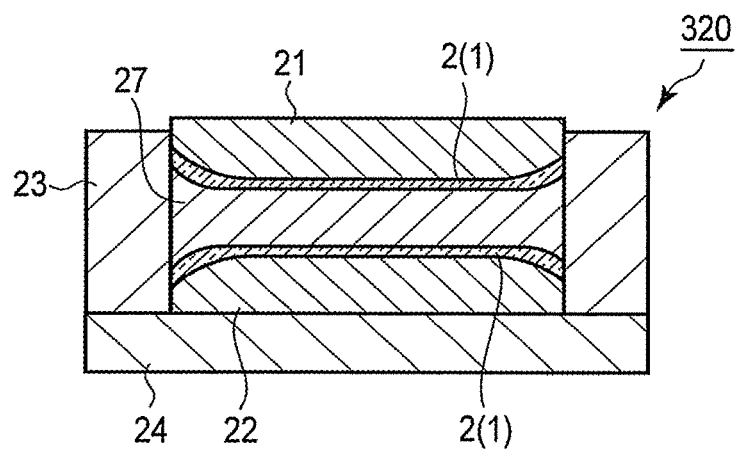
FIG. 16 is an explanatory view showing a mold assembly according to still another embodiment.

Furthermore, as shown in FIG. 16 as still another embodiment, the structure in which a mold assembly 320 has a double-stage structure provided with, in addition to an upper mold 21 and lower mold 22, a middle mold 27, and two shaped products set in one mold assembly 20 may also be employed.

Further, the to-be-formed material 1 and shaped product 2 are not limited to those of the above embodiments, and temperature setting can appropriately be modified. Furthermore, the elevating mechanism sections 43, 53, and 63 of the units are not limited to those of the above embodiments, and can be driven by various types of actuators such as an air cylinder, electric actuator, hydraulic cylinder, and the like.

The guide sections 27 each having a tapered shape are provided on the underside of the mold assembly 20. However, in place of these or in addition to these, on each of the top surfaces of the carry-in plate 81, loading plate 35, press plate 46, slow cooling plate 51, cooling plate 61, and carry-out plate 91 which are located on the lower side, and on each of which a mold assembly 20 is to be placed, tapered surfaces inclined with respect to both the vertical direction and conveyance direction may be formed.

Furthermore, in each of the embodiments described above, although an example in which the shape forming system is provided with a heating unit 30, pressing unit 40, slow cooling unit 50, and rapid cooling unit 60 has been described, the present invention can also be applied to a shape forming system and production line provided with no rapid cooling unit 60.

Further, it is also possible to combine features of a plurality of embodiments and implement the resulting configuration. Further, the present invention can naturally be variously modified and implemented within the scope not deviating from the gist of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A shape forming system comprising:
   a plurality of mold assemblies each configured to retain a to-be-formed material, each mold assembly including a sleeve configured to support outer sides of an upper mold and a lower mold and at least one coupling pin formed on each end face of the sleeve, wherein the at least one coupling pin extends along a conveyance path and forms a coupling section;
   a heating unit configured to heat the mold assemblies to thereby subject the to-be-formed material to a heating treatment;
   a pressing unit configured to apply pressure to the mold assemblies to thereby subject the to-be-formed material to a shape forming treatment, the shape forming treatment producing a shaped product;
   a cooling unit configured to cool the mold assemblies after the shape forming treatment to thereby subject the shaped product to a cooling treatment;
   an isolation chamber configured to accommodate therein the heating unit, the pressing unit, and the cooling unit arranged in series with each other; and
   a conveyance unit configured to move a plate, upon which each mold assembly is arranged, through each of the heating unit, the pressing unit, and the cooling unit, to thereby convey the mold assemblies in sequence, the conveyance unit including a shoving mechanism including a cylinder shaft configured to reciprocate in a conveyance direction of the coupling section to shove the coupling section along the conveyance path, the shoving mechanism being connected to a control device, wherein:

the plurality of mold assemblies are arranged in such a manner that end parts of adjoining coupling sections abut on each other to be continuous with each other so that at least one of the mold assemblies partially conveys at least another one of the mold assemblies and the plurality of mold assemblies are conveyed in a collective manner, the shoving mechanism is configured to convey a dummy mold assembly in place of one mold assembly of the plurality of mold assemblies according to an instruction of the control device at a time of starting or stopping an operation, at a time of maintenance, after completion of a required number of shaped products, or at a time of exchange of the mold assembly, wherein the dummy mold assembly has a shape identical to the one mold assembly, and the dummy mold assembly is arranged in such a manner that an end part of a coupling section abuts on an end part of an adjoining coupling section of another mold assembly of the plurality of mold assemblies or an end part of an adjoining coupling section of another dummy mold assembly so that the dummy mold assembly partially conveys said another mold assembly or said another dummy mold assembly.

\* \* \* \* \*